(12) United States Patent
Müller et al.

(10) Patent No.: US 12,703,443 B2
(45) Date of Patent: Aug. 11, 2026

(54) COUPLING DEVICE FOR A TRACTION VEHICLE WITH AN OBJECT DETECTION MEANS ATTACHED TO IT

(71) Applicant: JOST-WERKE DEUTSCHLAND GMBH, Neu-Isenburg (DE)

(72) Inventors: Mark Müller, Frankfurt (DE); Benjamin Kaufhold, Seeburg (DE); Steffen Haber, Gross-Gerau (DE); Stephan Gitzen, Riedstadt (DE); Anton Schlemm, Neu-Isenburg (DE)

(73) Assignee: Jost-Werke Deutschland GmbH, Neu-Isenburg (DE)

( * ) Notice: Subject to any disclaimer, the term of this patent is extended or adjusted under 35 U.S.C. 154(b) by 447 days.

(21) Appl. No.: 18/458,437

(22) Filed: Aug. 30, 2023

(65) Prior Publication Data

US 2024/0067280 A1 Feb. 29, 2024

(30) Foreign Application Priority Data

Aug. 31, 2022 (DE) ........................ 102022003183.3

(51) Int. Cl.
*B62D 53/08* (2006.01)
*H04N 23/57* (2023.01)

(52) U.S. Cl.
CPC ......... *B62D 53/0842* (2013.01); *H04N 23/57* (2023.01)

(58) Field of Classification Search
CPC .... B62D 53/0842; B62D 63/12; H04N 23/57; B60D 1/38; B60D 1/36; B60D 1/015; B60D 2300/80; B60R 1/003; B60R 11/04
USPC ........................................................ 280/504
See application file for complete search history.

(56) References Cited

U.S. PATENT DOCUMENTS

| | | | | |
|---|---|---|---|---|
| 3,697,974 A * | 10/1972 | Harris | B62D 53/12 | 340/687 |
| 7,959,178 B2 * | 6/2011 | Alguera | B60D 1/363 | 280/421 |
| 9,357,114 B1 * | 5/2016 | Whitehead | H04N 23/90 | |
| 2014/0151979 A1 * | 6/2014 | Puckett | B60D 1/62 | 280/477 |

FOREIGN PATENT DOCUMENTS

| | | |
|---|---|---|
| DE | 10155056 A1 | 6/2003 |
| DE | 102004029130 A1 | 12/2005 |
| DE | 102004048139 A1 | 4/2006 |
| DE | 102007053117 A1 | 5/2009 |
| DE | 102019008918 A1 | 6/2021 |
| DE | 102019008919 A1 | 6/2021 |
| EP | 3141685 A2 | 3/2017 |

* cited by examiner

*Primary Examiner* — Valentin Neacsu
*Assistant Examiner* — Mitchell James Price
(74) *Attorney, Agent, or Firm* — Hudak, Shunk & Farine Co. LPA

(57) ABSTRACT

A coupling device for a towing vehicle with an object detection device attached to the coupling device, wherein the coupling device has a coupling body in form of a fifth wheel plate and a locking mechanism, with which a coupling device in form of a kingpin is releasably held on the coupling body in its end position (E), wherein the coupling body includes an available space which is limited by a coupling device guiding contour and extends along a longitudinal axis (x), wherein the coupling device is at least partially immersed during coupling into the available space until reaching an end position (E).

20 Claims, 5 Drawing Sheets installation position 3 installation position 4 installation position 3 installation position 3

COUPLING DEVICE FOR A TRACTION VEHICLE WITH AN OBJECT DETECTION MEANS ATTACHED TO IT

FIELD OF THE INVENTION

The invention relates to a coupling device for a towing vehicle with an object detection means attached to the coupling device, wherein the coupling device has a coupling body in form of a fifth wheel plate and a locking mechanism, with which a coupling means in form of a kingpin is releasably held on the coupling body in its end position (E), wherein the coupling body comprises an available space which is limited by a coupling means guiding contour and extends along a longitudinal axis (x), wherein the coupling means is at least partially immersed during coupling into the available space until reaching an end position (E).

The object detection means can in particular be a camera, with the help of which the driver is provided with an image of the traffic area to the rear together with the trailer vehicle parked there in the driver's cab, particularly while a trailer vehicle is being coupled to the towing vehicle. With the help of the image, the towing vehicle can be maneuvered more precisely towards the coupling means of the trailer vehicle.

BACKGROUND OF THE INVENTION

A camera arranged on the coupling plate of a fifth wheel coupling is disclosed, for example, in DE 10 2004 048 139 A1 in connection with a safety device for an articulated truck consisting of a towing vehicle and a trailer. With the aid of the safety device, a permissible maximum distance between the towing vehicle and the trailer should be able to be monitored and/or maintained when the trailer rests on the towing vehicle, the kingpin is unlocked and the support legs are retracted. The position of the kingpin located on the semi-trailer relative to the fifth wheel plate can be determined by means of a camera arranged in or on the fifth wheel plate.

Another prior art is shown in DE 10 2004 029 130 A1 with a camera mounted as close as possible to the longitudinal axis of the vehicle on the side, under or in the fifth wheel plate. Attaching the camera in or near the longitudinal axis of the vehicle has the advantage that it provides a largely distortion-free image. However, the closer the camera is placed to the longitudinal axis of the vehicle, the more likely it is in the area of influence of the coupling means on the trailer vehicle, such as a kingpin, and is therefore exposed to an increased risk of damage.

Document DE 101 55 056 A1 describes a plug-in coupling system for connecting lines between two vehicles. The plug-in coupling system comprises a plug socket which is movably arranged in the area of the insertion opening of a fifth wheel plate contacting a complementary plug held ready on the semi-trailer after the coupling of a semi-trailer by axial movement. The plug socket is moved in and out by a corresponding signal from a first sensor which is also arranged in a stationary manner in the area of the insertion opening.

Document DE 10 2007 053 117 A1 deals with a drive for a movable part in a vehicle, such as a camera, which is movably mounted between an extended position moved out of the vehicle and a retracted position inside the vehicle. The roadway of the vehicle is to be recorded with the aid of the camera.

Document EP 3 141 685 A2 discloses a sensor device integrated in a module unit for contactless actuation of a movable part of a motor vehicle, such as a tailgate, side door or hood.

Document DE 10 2019 008 918 A1 proposes a fifth wheel coupling comprising a fifth wheel plate and a camera. The fifth wheel plate has two coupling horns, which laterally delimit a conical drive-in opening that is shaped to the rear. The camera should be fixed to one of the two insertion horns on the fifth wheel plate.

A stationary attachment of the camera to bearing elements of the fifth wheel plate can be found in DE 10 2019 008 919 A1.

SUMMARY OF THE INVENTION

The invention was therefore based on the object of arranging an object detection means with a low risk of damage as close as possible to the longitudinal axis of the towing vehicle.

According to the invention, the underlying object is solved with an object detection means that is mounted in a coupling means guiding contour so that it can move between a functional position protruding into the available space and a dodged position sunk into the coupling means guiding contour. An object detection means is understood to mean, for example, a camera which can operate in a non-visible range, for example in the infrared range, and/or in the visible spectrum. In addition to 2D image sensors, imaging sensors that can capture 3D information are also suitable. These include in particular laser scanners, radar sensors and ultrasonic sensors. For better protection against external influences, the object detection means can comprise a housing and preferably form a common structural unit with it.

The data provided by the object detection means can be displayed on a display device in the driver's cab and can be used by the driver as a visual maneuvering aid for coupling the trailer vehicle. However, it is also possible for the data provided by the object detection means to be fed into the electronic data system of the towing vehicle and for the towing vehicle to carry out an autonomous or semi-autonomous coupling of the trailer vehicle on the basis of this data.

A semi-autonomous coupling means that the system is an assistance system for the driver to support him while manoeuvring.

The coupling means guiding contour surrounds the rearwardly open, free space in the coupling body, which is used for driving in and out as well as for fixing the trailer-side coupling means in its end position. The coupling means guide contour typically comprises wall structures of the coupling body running essentially in the direction of the vertical axis, which catch the trailer-side coupling means during coupling and guide them laterally in the direction of the locking mechanism of the coupling device while the towing vehicle drives backwards.

Due to the movable mounting of the object detection means, it can remain in its functional position until a late point in time in a favorable area within or close to the longitudinal axis of the towing vehicle or the coupling body. In that late point in time the trailer-side coupling means has already entered the available space of the coupling body and is laterally overlapped from the coupling means guiding contour. A lateral incorrect coupling of the trailer-side coupling means is no longer to be expected at this point in time. The moveable mounting ensures that the object detection means is removed from the movement path of the trailer-side coupling means and arrives in the sunk, dodged position. In the evasive, dodged position, which is lower than the guiding contour of the coupling body, the coupling means on the trailer side travels over the object detection means in a non-destructive manner.

In the lowered dodged position, the object detection means is advantageously moved back at least so far that the object detection means terminates with the adjacent section of the coupling means guiding contour. The trailer-side coupling means passes the object detection means with sliding contact.

It is provided that the object detection means is movably mounted along a line of movement.

According to a first preferred embodiment, the object detection means is mounted in particular along an effective axis by means of a spring element. The spring element keeps the object detection means spring-biased in the pushed-out functional position. Upon contact with the trailer-side coupling means, this pushes the object detection means against the force of the spring element into the pushed-back dodged position. The retracted dodged position and the pushed-forward functional position then lie in the effective axis of the spring element. The main advantage of this embodiment is that no further servomotors or actuators are necessary.

According to a second preferred embodiment, the object detection means can additionally or alternatively be mounted about one or more axis(s) of rotation by means of a spring element and/or a lever. In this embodiment, the trailer-side coupling means or other components of the trailer vehicle also initiate a movement of the object detection means between its functional position and retracted dodged position. However, this does not take place directly through contact of the trailer-side coupling means or other components with the object detection means, but through contact with the lever, which forms a kinematic chain with the object detection means. The advantage of this embodiment is that the object detection means remains in the immersed avoidance position due to its continuous load from the trailer vehicle when driving and is housed there protected against external influences.

According to a third preferred embodiment, the object detection means can be moved by means of an actuator. In this case, the actuator moves the object detection means in a non-contact and mechanical manner, independently of the trailer-side coupling means or other components of the trailer vehicle. In particular, the object detection means can also be used for other tasks, for example as a maneuvering aid when reversing, regardless of whether a trailer vehicle is coupled or not.

It has turned out to be particularly favorable if the actuator is connected to at least one proximity sensor. In particular, the proximity sensor prompts an automated movement of the object detection means between the functional position and the dodged position in both directions by activating the actuator, without any intervening action of the driver.

The proximity sensor is expediently formed from the object detection means. The object detection means is used anyway to detect the position of the trailer-side coupling means and can therefore be viewed as a proximity sensor. If the trailer-side coupling means has arrived in front of the object detection means, filling the image, it is time to activate the actuator and to move the object detection means from the functional position to the dodged position.

In the area of the end position of the kingpin, the fifth wheel coupling plate can have a C-shaped bearing area that partially encloses the kingpin in the circumferential direction, and the coupling means guiding contour can be formed from the C-shaped bearing area. The C-shaped bearing area, which is open towards the rear, is often designed as a replaceable wear ring.

In any case, the C-shaped bearing area limits the available space in the direction of travel of the fifth wheel plate and thus forms the front end of the coupling means guiding contour in the direction of travel. The movably mounted object detection means is consequently inserted into the C-shaped storage area.

The fifth wheel coupling plate can also have two coupling horns delimiting an entrance opening in the rearward direction, and the coupling means guiding contour can be formed from flanks of the coupling horns that face one another. In this configuration, the object detection means is inserted into a flank of one of the two coupling horns and projects laterally into the entrance opening in the functional position. In the evasive dodged position, the object detection means moves into the associated coupling horn and preferably terminates flush with the associated flank of the coupling horn.

Alternatively, the fifth wheel coupling plate can have a cross bridge arranged under an entrance opening in the rearward direction, and the coupling means guiding contour can be formed from the cross bridge. The cross bridge increases the strength of the fifth wheel coupling plate and is connected to the underside of the fifth wheel plate on both sides of the entrance opening. The cross bridge forms a lower end of the available space in the vertical axis and thus limits the coupling means guiding contour at the bottom. In this refinement, the object detection means is inserted into the cross bridge. The cross bridge can also be connected to the fifth wheel coupling plate on only one side and serve as a holder for the object detection means.

A further alternative is that the fifth wheel plate has a connector console of a line coupling system in the rearward direction and the coupling means guiding contour is formed from the connector console.

The connector console automatically connects to a complementary trailer vehicle connector during the hitching process. The connector console also limits the available space of the coupling body in the vertical axis downwards and continues the lower coupling means guiding contour in the rear direction, so that an approaching kingpin can run over the connector console unhindered during coupling. In this configuration, the movably mounted object detection means is fastened in or on the connector console.

Expediently, the object detection means is pivotably mounted with respect to the coupling device about a transverse axis oriented transversely to the longitudinal axis. In particular, in the case of digital image recognition, a trailer-side coupling means can be recognized and the object detection means can be directed at the coupling means. For this purpose, the object detection means is mounted to rotate about the transverse axis and is preferably actively positioned about this transverse axis by means of a servomotor.

BRIEF DESCRIPTION OF THE DRAWINGS

For better understanding, the invention is explained in more detail below with reference to 9 Figures, showing in FIG. 1: a rear view and top view of a coupling body with possible installation positions of the object detection means.

DETAILED DESCRIPTION OF THE INVENTION

Figure 1:
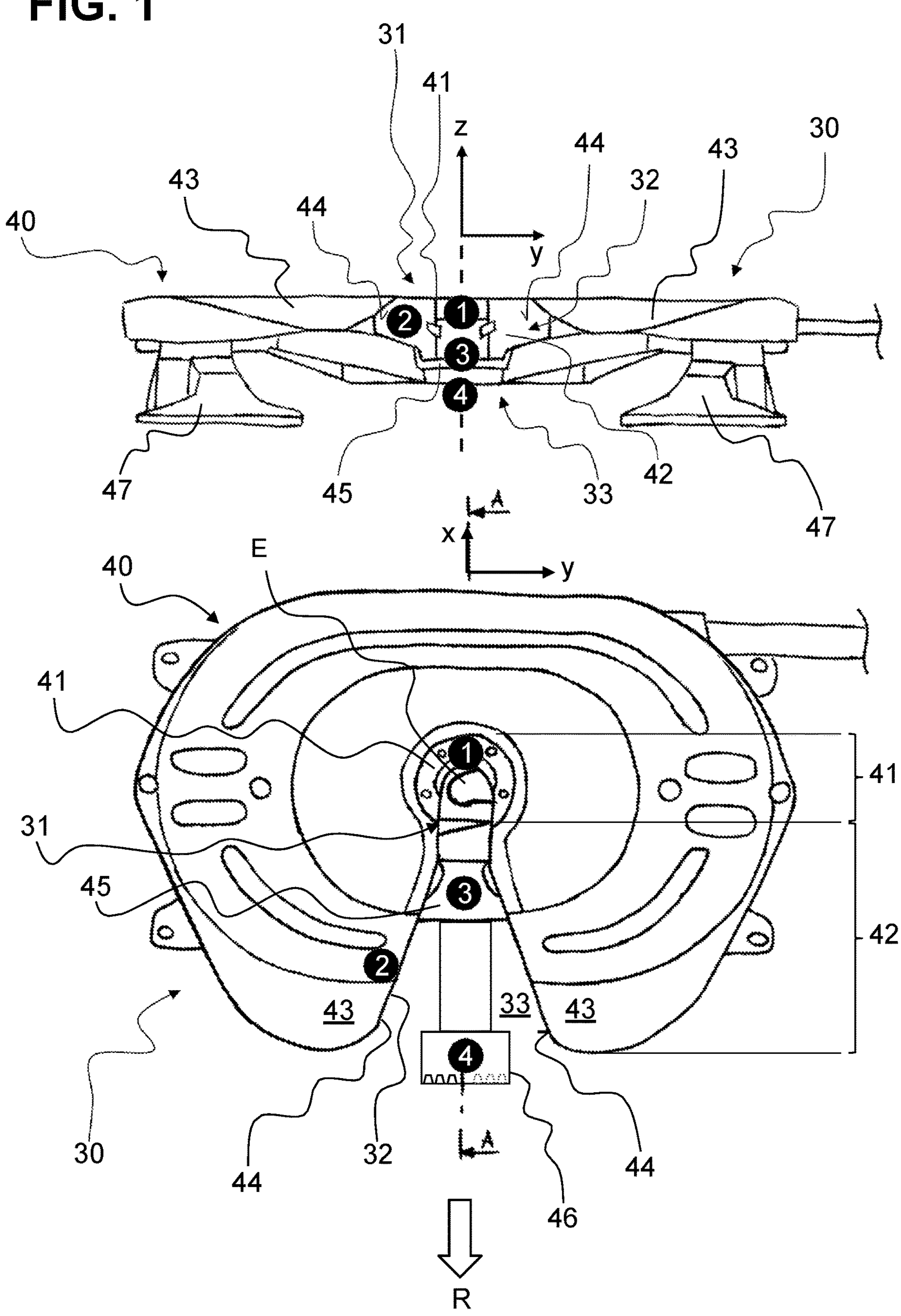

FIG. 1 shows a rear view and a plan view of a coupling body 30 typically mounted on a towing vehicle, not shown, into which a coupling means 50 (see FIG. 6) of a trailer vehicle can be entered and fixed in a pivotable manner by means of a locking mechanism 31. In the present exemplary embodiment, the coupling body 30 on the towing vehicle is designed as a fifth wheel plate 40 and the coupling means 50 on the trailer is designed as a kingpin 51. In the assembled state, the fifth wheel plate 40 is fastened to the towing vehicle by means of two bearing blocks 47 lying opposite one another in a transverse axis y.

Before the kingpin 51 is coupled, it is located in the rearward direction R to the fifth wheel plate 40, which has an entrance opening 42 that widens conically in the distal direction on the side facing the kingpin 51. The entrance opening 42 is delimited by two coupling horns 43 which are arranged on both sides of the entrance opening 42 and which in turn are an integral part of the fifth wheel plate 40 in one piece.

At its proximal end, the entrance opening 42 merges into a bearing area 41 arranged centrally in the fifth wheel plate 40. In the bearing area 41 the kingpin 51 reaches its end position E for the driving operation and is releasably held there by the locking mechanism 31 which can be pivoted into and out of the bearing area 41.

The bearing area 41 and the entrance opening 42 form a coherent and merging, available space 33, which in an extension in the direction of a transverse axis y and a vertical axis z of the fifth wheel plate 40 is always dimensioned larger than the kingpin 51 provided for entry into the fifth wheel plate 40.

The available space 33 is delimited laterally in a section of the entrance opening 42 by vertical flanks 44 of the coupling horns 43, the flanks 44 also continuing in the bearing area 41 corresponding to a thickness of the fifth wheel plate 40. The available space 33 is limited in the vertical axis z at the top by the upper side of the fifth wheel plate 40 and at the bottom, in a transition area between the entrance opening 42 and the bearing area 41, by a cross bridge 45. The cross bridge 45 runs under the entrance opening 42 or the bearing area 41 and is run over by the kingpin 51 during coupling and uncoupling.

A connector console 46 of a line coupling system for the automated connection and disconnection of the supply lines during the mechanical coupling or uncoupling process of the towing vehicle and trailer vehicle can also be attached to the fifth wheel plate 40. The connector console 46 is held in whole or in part in the entrance opening 42 or offset in the rearward direction relative to the entrance opening 42. In the vertical axis z, the connector console 46 can be run over by the kingpin 51 without contact.

In order to minimize spatial distortions in the image provided by an object detection means 10 and to avoid having to process them computationally at all or only as little as possible, the object detection means 10 should be arranged on the coupling body 30, if possible, in particular on the fifth wheel plate 40, and also in its longitudinal axis x or if possible close to the longitudinal axis x.

FIG. 1 represents appropriate installation positions for the object detection means 10 in an installation position 1 of the bearing area 41, an installation position 2 at the entrance opening 42, an installation position 3 at the cross bridge 45 and an installation position 4 at the connector console 46. All installation positions 1, 2, 3, 4 are in the area of influence of an incoming and outgoing kingpin 51, which would destroy an object detection means 10 protruding statically into the available space 33 in the event of a collision.

Figure 2:
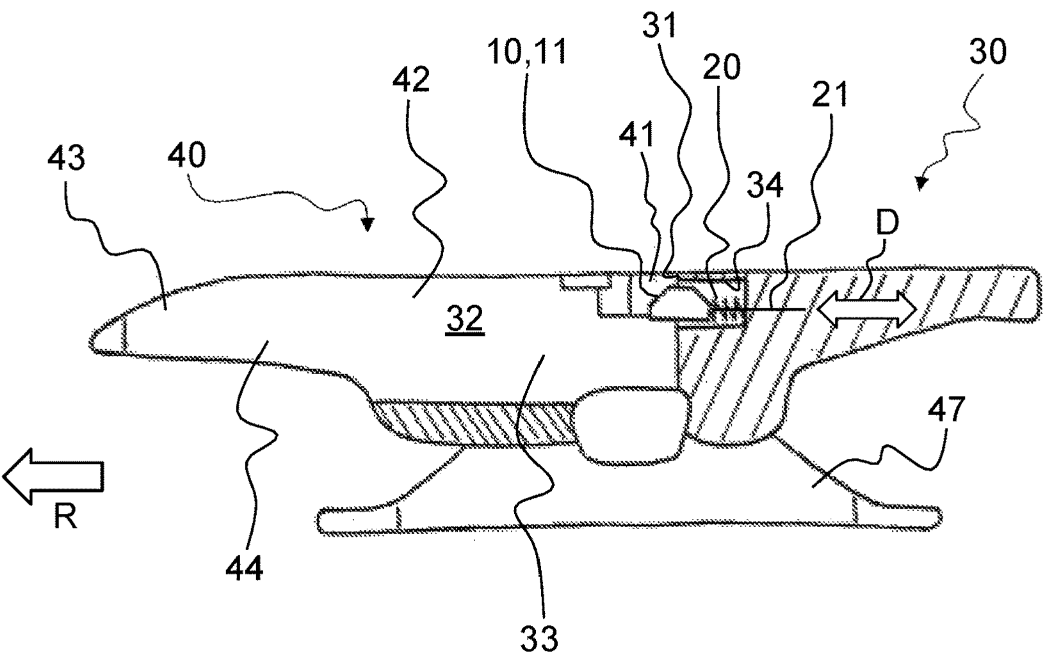
FIG. 2: a longitudinal section through a coupling body with object detection means arranged in the bearing area of a fifth wheel plate in the functional position.

The FIG. 2 shows a first installation position 1, in which the object detection means 10 is movably mounted in the bearing area 41. The bearing area 41 forms an adjacent coupling means guiding contour 32. In the coupling body 30, in the embodiment shown according to FIG. 2 in the bearing area 41 of the fifth wheel plate 40, a receiving opening 34 is introduced complementary to the object detection means 10. The receiving opening 34 is dimensioned such that the object detection means 10 can lowered completely into the receiving opening 34.

Before coupling and while the kingpin 51 is approaching, the object detection means 10 is held in a functional position 11 protruding into the available space 33 by means of a spring element 20. It is only when the kingpin 51 hits the object detection means 10 that it is pressed back in an active axis 21 against the preload of the spring element 20 and into the receiving opening 34.

When the object detection means 10 is aligned in the rearward direction R of the longitudinal axis x, the active axis 21 of the spring element 20 is also aligned in the longitudinal axis x. In this case, the direction of the incoming kingpin 51 corresponds to the active axis 21 of the spring element 20.

In the case of an offset alignment of the object detection means 10 in the circumferential direction of the bearing area 41, the active axis 21 of the spring element 20 can also be offset radially and is then no longer aligned with the direction of the incoming kingpin 51. Due to the large force of the approaching kingpin 51, a proportional force vector directed in the direction of the active axis 21 is then sufficient to push the object detection means 10 back into its receiving opening 34.

Figure 3:
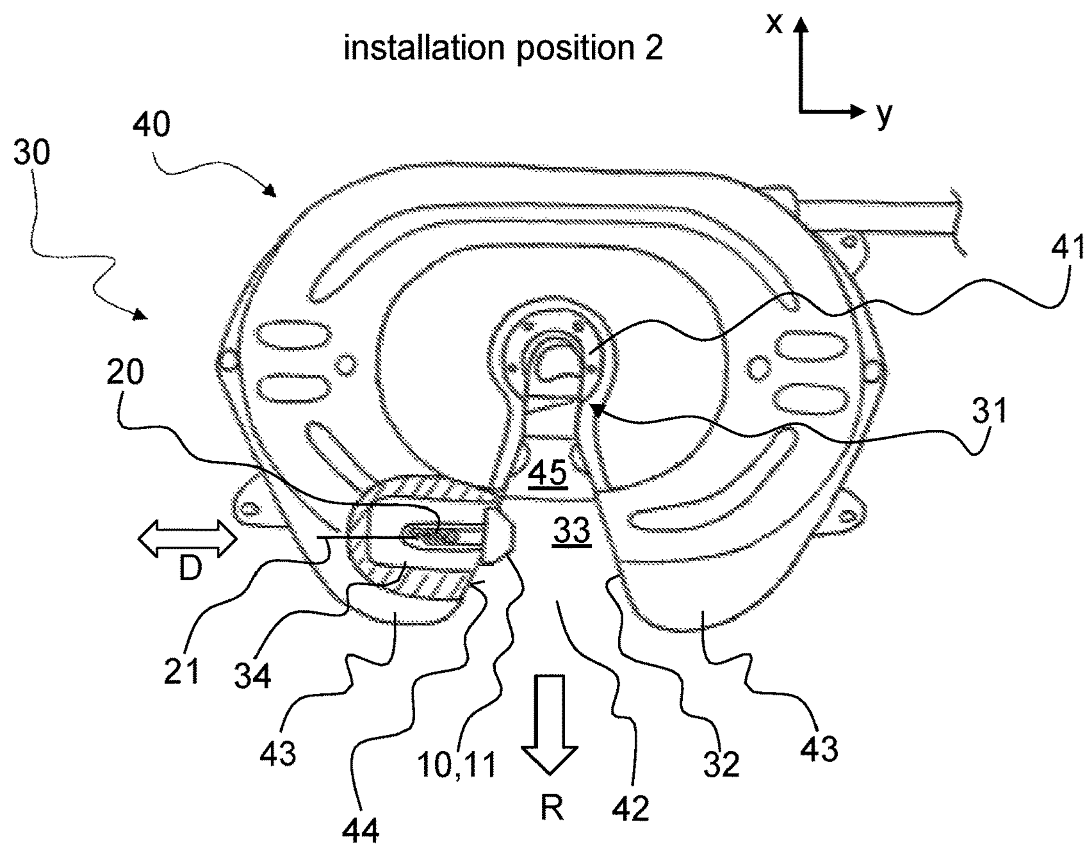
FIG. 3: a plan view of a coupling body with object detection means arranged in one of the coupling horns of the fifth wheel plate in the functional position.

FIG. 3 relates to an alternative exemplary embodiment in which the object detection means 10 is accommodated in one of the two lateral flanks 44 of the coupling horns 43 according to the installation position 2. The active axis 21 of the spring element 20 and the axial extent of the receiving opening 34 are aligned in the transverse axis y. In the functional position 11 the object detection means 10 protrudes spring-loaded with respect to the coupling means guiding contour 32 formed from the associated flank 44 and protrudes into the entrance opening 42. The functional position 11 enables the identification of the trailer-side coupling means 50, for example the kingpin 51.

Figure 4:
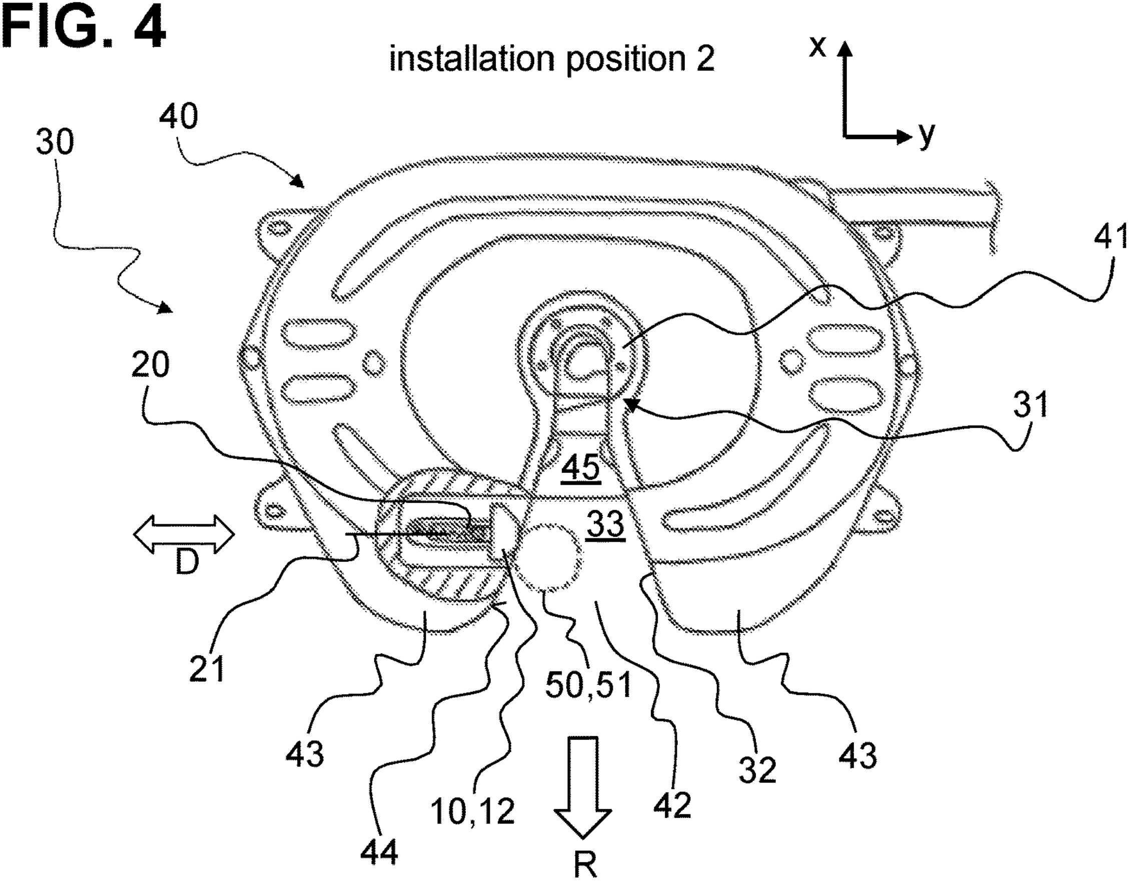
FIG. 4: a plan view according to FIG. 3 with object detection means in a dodged position.

FIG. 4 illustrates the situation of installation position 2 in the event of a collision of the kingpin 51 with the object detection means 10, through which a proportionate force is transmitted in the transverse axis y to the object detection means 10 and this is pushed back within the receiving opening 34 in a direction of movement D to a dodged position 12 so that the kingpin 51 can pass through the otherwise available space 33 in the entrance opening 42. In the dodged position 12, the object detection means 10 has been pushed in so far with respect to the adjacent flank 44 that parts no longer protrude and the kingpin 51, guided by the flank 44, moves in the direction of the bearing area 41.

Figure 5:
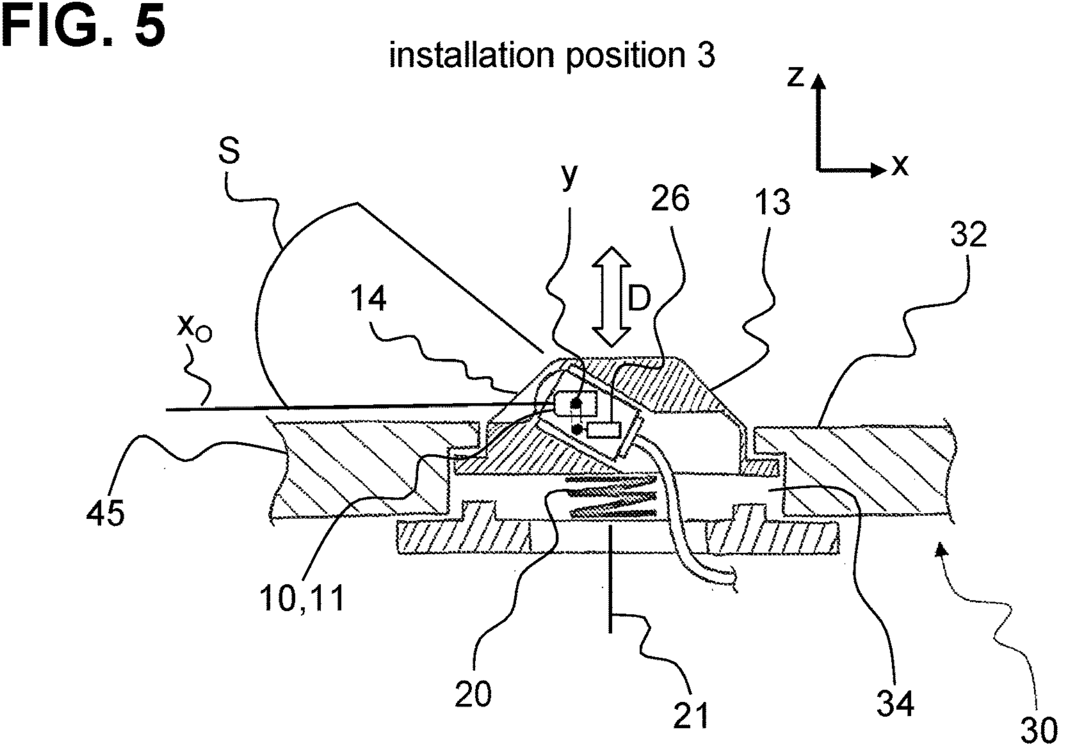
FIG. 5: a longitudinal section through a cross bridge of the fifth wheel plate with object detection means arranged in the cross bridge in the functional position.

In FIG. 5 a further installation position 3 is described, in which the object detection means 10 is accommodated in the cross bridge 45 and dips away downwards in the vertical axis z. The cross bridge 45 forms the lower coupling means guiding contour 32. For this purpose, the object detection means 10 is movably mounted in the receiving opening 34 by means of the spring element 20 and, if a kingpin 51 approaches from an approach sector S, is moved by the kingpin 51 in the direction of movement D, which corresponds to the active axis 21 of the spring element 20, and pressed in the direction of the vertical axis z down out of the way.

The object detection means 10 has a housing 13 in which a servomotor 26 is also accommodated. The servomotor 26 actively aligns the object detection means 10 about the transverse axis y in such a way that the optical axis $x_O$ of the object detection means 10 points to the rear, ie parallel to the given upper edge of the terrain.

Figure 6:
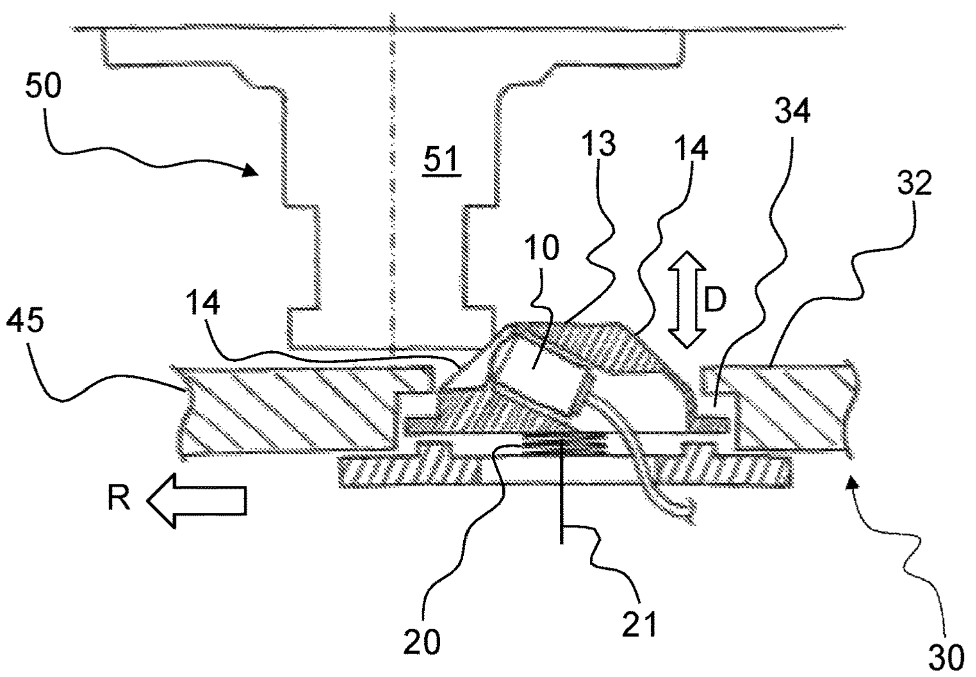
FIG. 6: a longitudinal section according to FIG. 5 with the kingpin approached and object detection means between the functional position and the dodged position.

FIG. 6 shows the same installation position 3 as FIG. 5 immediately during contact of the object detection means 10 with an approaching kingpin 51. In the enlarged representation of FIG. 6 the housing 13 can be seen particularly well, on the section of which protruding with respect to the coupling means guiding contour 32 has a mushroom head shape with two housing impact surfaces 14 which are inclined to the longitudinal axis x.

The moving-in kingpin 51 first collides with the housing impact surface 14 lying on the left in the image plane, in the rearward direction R, and thereby pushes the object detection means 10 in the direction of its dodged position 12 into the receiving opening 34. When the housing 13 is driven over, the restoring force of the spring element 20 means that the housing 13 continues to be pressed against the kingpin 51 until the kingpin 51 is no longer in active contact.

After a mechanical opening of the locking mechanism 31, the towing vehicle and the trailer vehicle are separated from one another. The kingpin 51 moves in the rearward direction R and this time first hits the housing impact surface 14 on the right in the image plane and then pushes the housing 13 of the object detection means 10 down into the receiving opening 34.

Figure 7:
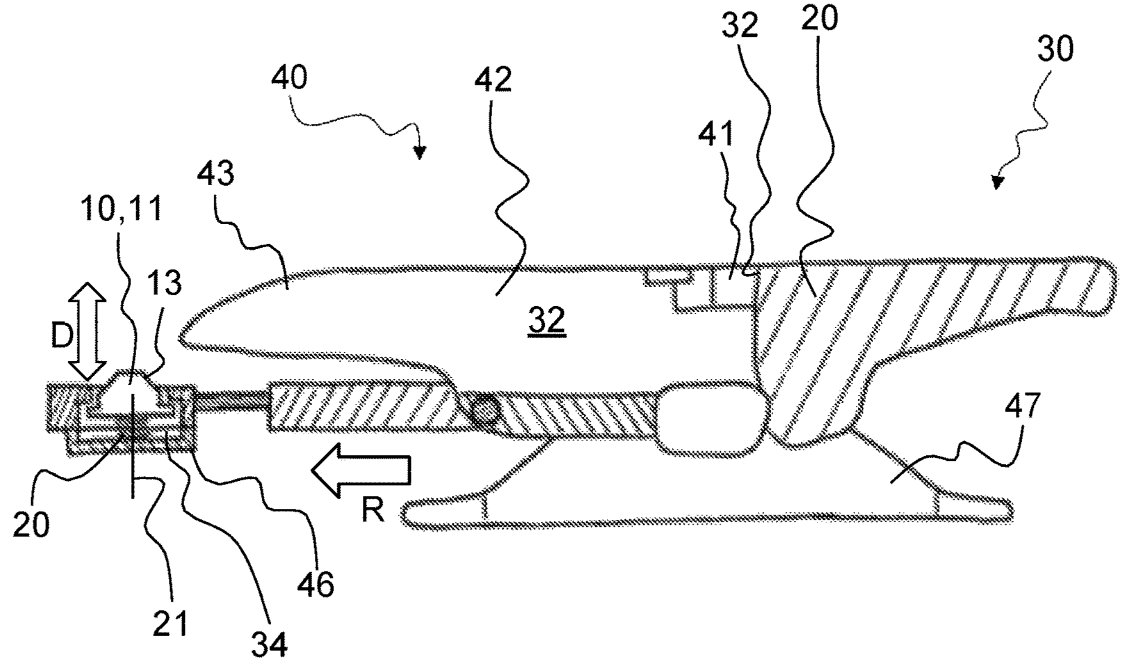
FIG. 7: a longitudinal section through a coupling body with object detection means arranged in a connector console of a line coupling system in the functional position.

FIG. 7 shows an installation position 4 in which the object detection means 10 is movably mounted in the coupling means guiding contour 32 delimited by the connector console 46. A receiving opening 34 oriented with its axial extension in the vertical axis z is formed in the connector console 46, into which the object detection means 10 is inserted with its spring element 20 so that it can move in the active axis 21. The direction of movement D of the object detection means 10 corresponds to the vertical axis z. When the kingpin 51 approaches, it first hits the connector console 46, which is arranged to the rear below the entrance opening 42, and pushes the object detection means 10 temporarily against the resistance of the spring element 20 into the connector console 46, so that the full depth of the entrance opening 42 is available for further coupling of the kingpin 51.

Figure 8:
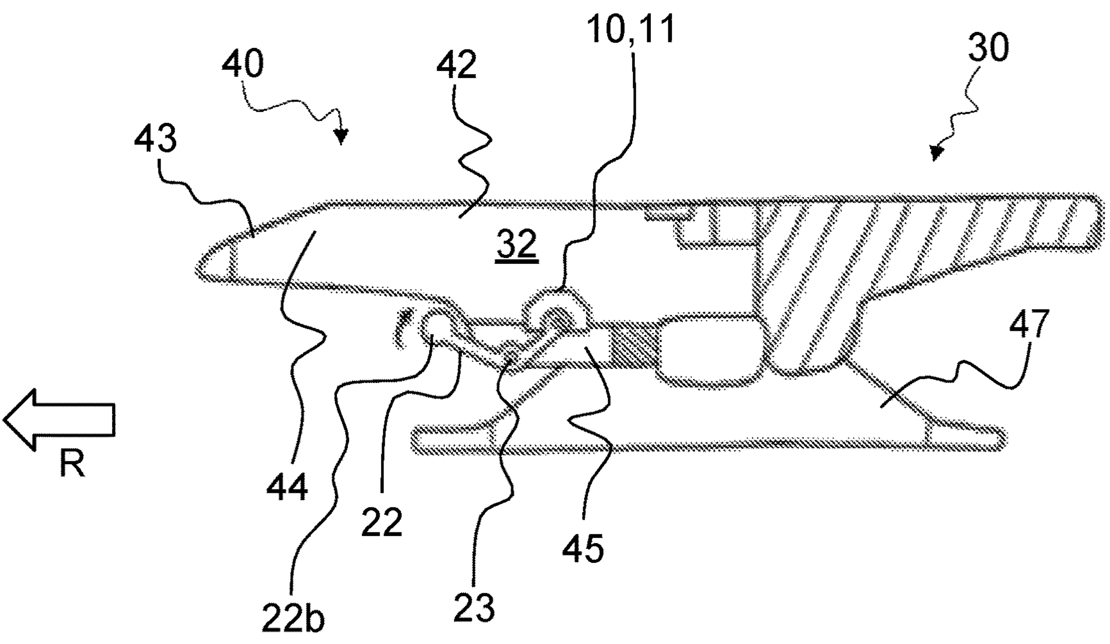
FIG. 8: a longitudinal section through a coupling body with object detection means arranged in a cross bridge of the fifth wheel coupling plate according to a second, alternative embodiment.

FIG. 8 shows another embodiment in which an approaching kingpin 51 does not come into direct contact with the object detection means 10 or its housing 13, but rather with a bow-shaped lever 22, one end of which is pivotably connected to the object detection means 10 and the opposite, second end of which is formed with a contact bead **22*b*. The lever 22 is also pivotally mounted between its first and second end centrally by means of an axis of rotation 23** about the transverse axis y.

During coupling, the kingpin 51 first hits the contact bead **22*b* and pivots it clockwise about the axis of rotation 23, as a result of which the object detection means 10 is retracted from its initial functional position 11 in the same direction and moves into the lowered dodged position 12**.

Figure 9:
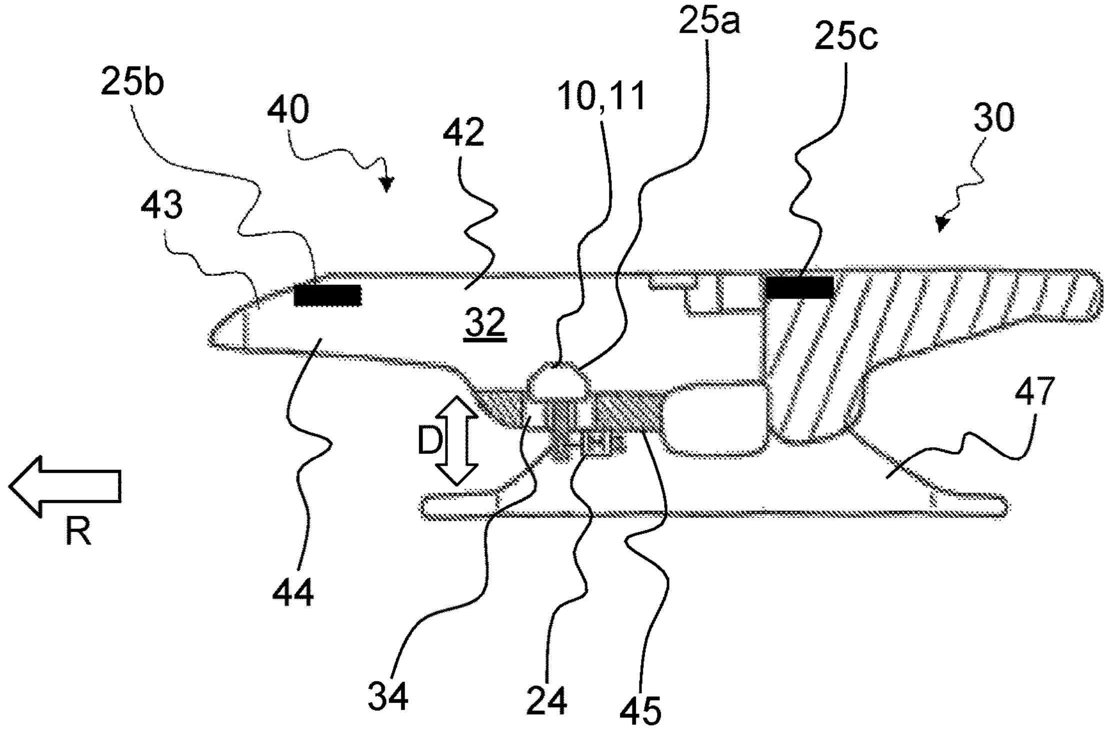
FIG. 9: a longitudinal section through a coupling body with object detection means arranged in a cross bridge of the fifth wheel coupling plate according to a third, alternative embodiment.

FIG. 9 shows another embodiment in which there is no direct contact between parts of the object detection means 10 and the kingpin 51. In this embodiment, the object detection means 10 is coupled to an actuator 24 which, when a kingpin 51 approaches, retracts the object detection means 10 from the functional position 11 into the receiving opening 34 until the dodged position 12 is reached. The actuator 24 is connected to at least one proximity sensor **25*a*, 25*b*, 25*c*, which provides the actuator 24 with a corresponding signal when the distance falls below a minimum distance. The object detection means 10 itself can serve as the proximity sensor 25*a*, which in any case identifies the kingpin 51 and can generate a distance value as a function of the visible size. Alternatively or additionally, it is possible to provide at least one proximity sensor 25*b* on an end of the coupling horn 43 or both coupling horns 43 in the rearward direction R. Alternatively or additionally, a proximity sensor 25*c* should also be arranged in the area of the bearing area 41. This one detects an increase in the distance between the proximity sensor 25*c* and the kingpin 51, which is particularly important when uncoupling, in order to return the object detection means 10 that may be aligned in the functional position 11 back to the dodged position 12 in good time by means of the actuator 24**.

LIST OF REFERENCE NUMERALS

1 installation position bearing area
2 installation position entrance opening
3 installation position cross bridge
4 installation position connector console
10 object detection means
11 functional position
12 dodged position
13 housing object detection means
14 housing impact surface
20 spring element
21 active axis spring element
22 lever
**22*b*** contact bead
23 axis of rotation lever/spring element
24 actuator
**25*a-c*** proximity sensor
26 servomotor
30 coupling body
31 locking mechanism
32 coupling means guiding contour 33 available space
34 receiving opening object detection means
40 fifth wheel plate
41 bearing area
42 entrance opening
43 coupling horn
44 flank coupling horn
45 cross bridge
46 connector console line coupling system
47 bearing block
50 coupling means of trailer vehicle
51 kingpin
D direction of movement of object detection means
E end position
R rearward direction
S approach sector coupling means
x longitudinal axis
$x_O$ optical axis object detection means
y transverse axis
z vertical axis

What is claimed is:

1. A coupling device for a towing vehicle with an object detection means attached to the coupling device, comprising:

the coupling device having a coupling body in the form of a fifth wheel plate and a locking mechanism, with which a coupling means in form of a kingpin is releasably held on the coupling body in its end position (E), wherein the coupling body comprises an available space which is limited by a coupling means guiding contour and extends along a longitudinal axis (x), wherein the coupling means is at least partially immersed during coupling into the available space until reaching an end position (E), and wherein the object detection means is a camera and the camera is mounted in the coupling means guiding contour so that the camera can move between a functional position protruding into the available space and a dodged position sunk into the coupling means guiding contour.

2. The coupling device according to claim 1, wherein in the dodged position the object detection means is moved back at least so far that the object detection means terminates with the adjacent section of the coupling means guiding contour.

3. The coupling device according to claim 2, wherein the object detection means is mounted by means of a spring element along an active axis.

4. The coupling device according to claim 3, wherein the object detection means is mounted by means of a spring element and/or a lever about one or more axis of rotation(s).

5. The coupling device according to claim 2, wherein the object detection means can be moved by means of an actuator.

6. The coupling device according to claim 5, wherein the actuator is connected to at least one proximity sensor, and wherein the proximity sensor is formed from the object detection means.

7. The coupling device according to claim 6, wherein the fifth wheel plate in an area of the end position (E) of the kingpin comprises a C-shaped bearing area which partially encloses the kingpin in a direction around a circumference of the kingpin, wherein the coupling means guiding contour is formed from the C-shaped bearing area, and wherein the fifth wheel plate comprises two coupling horns delimiting an entrance opening in the rearward direction (R), wherein the coupling means guiding contour is formed from flanks of the coupling horns which are facing one another.

8. The coupling device according to claim 7, wherein the fifth wheel plate has a cross bridge arranged under an entrance opening in the rearward direction (R), wherein the coupling means guiding contour is formed from the cross bridge, and wherein the fifth wheel plate in the rearward direction (R) has a connector console of a line coupling system, wherein the coupling means guiding contour is formed from the connector console.

9. The coupling device according to claim 8, wherein the object detection means is mounted pivotably with respect to the coupling device about a transverse axis (y) oriented transversely to the longitudinal axis (x), and wherein the object detection means can be actively positioned about the transverse axis (y) by means of a servomotor.

10. The coupling device according to claim 1, wherein the object detection means is mounted by means of a spring element along an active axis.

11. The coupling device according to claim 1, wherein the object detection means is mounted by means of a spring element and/or a lever about one or more axis of rotation(s).

12. The coupling device according to claim 1, wherein the object detection means can be moved by means of an actuator.

13. The coupling device according to claim 12, wherein the actuator is connected to at least one proximity sensor.

14. The coupling device according to claim 13, wherein the proximity sensor is formed from the object detection means.

15. The coupling device according to claim 1, wherein the fifth wheel plate in an area of the end position (E) of the kingpin comprises a C-shaped bearing area which partially encloses the kingpin in a direction around a circumference of the kingpin, wherein the coupling means guiding contour is formed from the C-shaped bearing area.

16. The coupling device according to claim 1, wherein the fifth wheel plate comprises two coupling horns delimiting an entrance opening in the rearward direction (R), wherein the coupling means guiding contour is formed from flanks of the coupling horns which are facing one another.

17. The coupling device according to claim 1, wherein the fifth wheel plate has a cross bridge arranged under an entrance opening in the rearward direction (R), wherein the coupling means guiding contour is formed from the cross bridge.

18. The coupling device according to claim 1, wherein the fifth wheel plate in the rearward direction (R) has a connector console of a line coupling system, wherein the coupling means guiding contour is formed from the connector console.

19. The coupling device according to claim 1, wherein the object detection means is mounted pivotably with respect to the coupling device about a transverse axis (y) oriented transversely to the longitudinal axis (x).

20. The coupling device according to claim 19, wherein the object detection means can be actively positioned about the transverse axis (y) by means of a servomotor.

* * * * *